United States Patent [19]

Miyagi

[11] 4,430,973
[45] Feb. 14, 1984

[54] BYPASS AIR INTAKE CONTROL FOR AN INTERNAL COMBUSTION ENGINE

[75] Inventor: Hideo Miyagi, Okazaki, Japan

[73] Assignee: Toyota Jidosha Kogyo Kabushiki Kaisha, Toyota, Japan

[21] Appl. No.: 288,771

[22] Filed: Jul. 31, 1981

[30] Foreign Application Priority Data

Aug. 5, 1980 [JP] Japan .................. 55-106732

[51] Int. Cl.³ .............................................. F02D 1/04
[52] U.S. Cl. ................... 123/339; 123/350; 123/585
[58] Field of Search .......... 123/339, 350, 352, 585, 123/586, 587

[56] References Cited

U.S. PATENT DOCUMENTS

| | | | |
|---|---|---|---|
| 4,240,145 | 12/1980 | Yano et al. | 123/587 |
| 4,291,656 | 9/1981 | Miyagi et al. | 123/339 |
| 4,306,527 | 12/1981 | Kinugawa et al. | 123/352 |
| 4,337,742 | 7/1982 | Carlson et al. | 123/585 |
| 4,344,398 | 8/1982 | Ikeura | 123/339 |

*Primary Examiner*—Parshotam S. Lall
*Attorney, Agent, or Firm*—Kenyon & Kenyon

[57] ABSTRACT

The cross-sectional area of a bypass passage around a throttle valve in an intake passage of an internal combustion engine is additionally increased by a predetermined value only when the throttle valve changes from an open position to the fully closed position during a heavy load condition or during a transitional condition from the heavy load condition to a light load condition. Therefore, the flow rate of the intake air at deceleration is not additionally increased during a light load condition, since that would cause the operation of the engine to be stable during deceleration.

6 Claims, 8 Drawing Figures

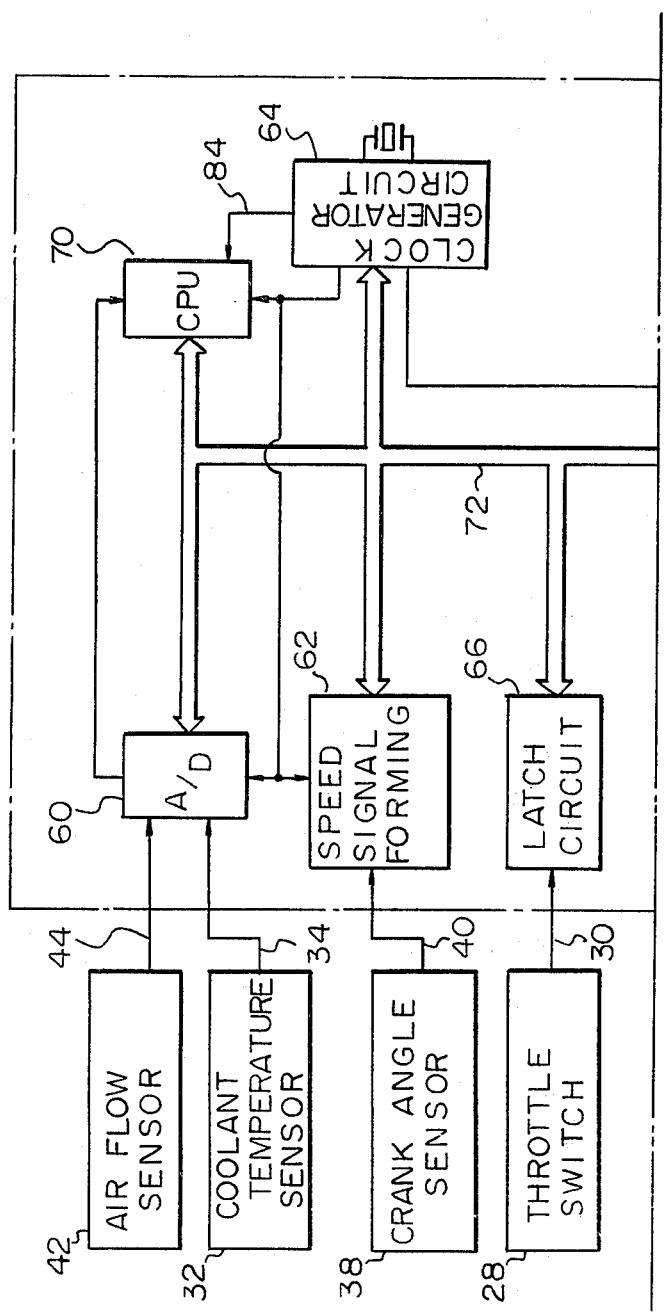

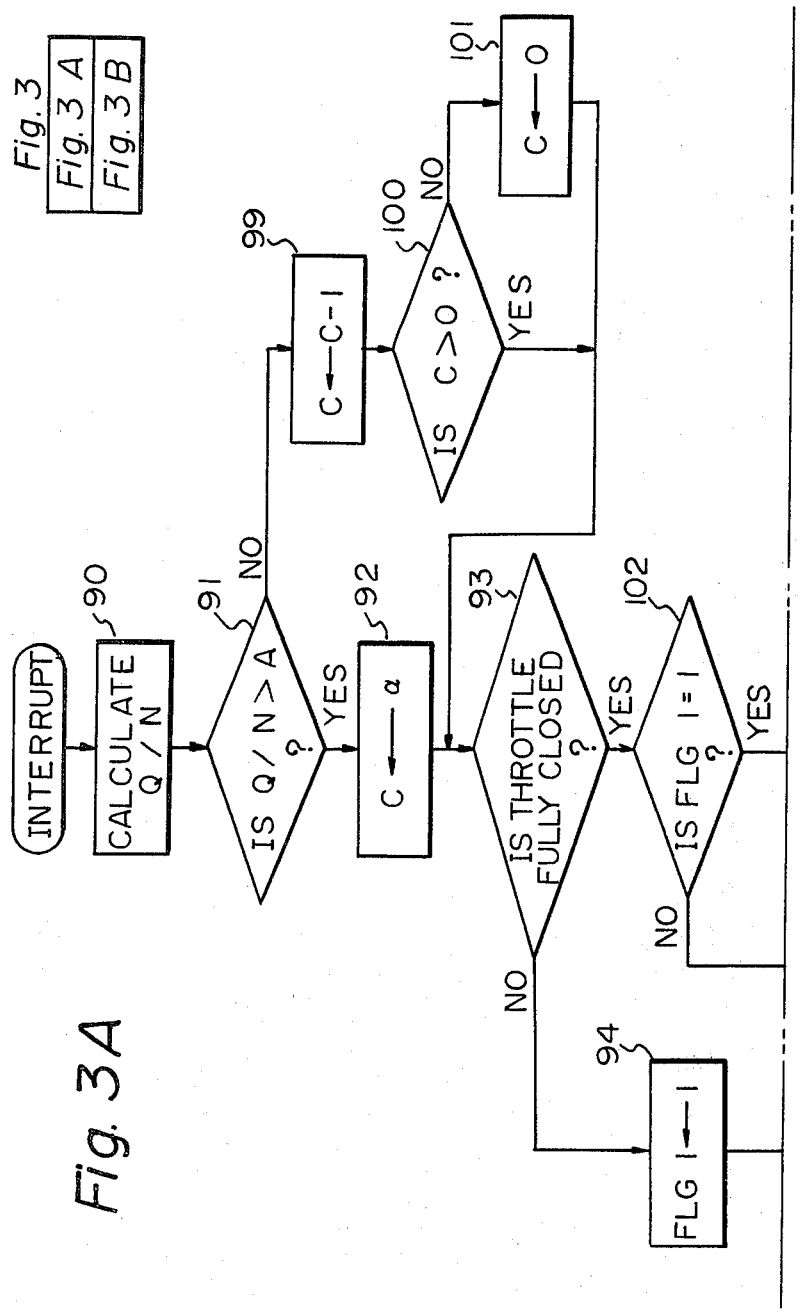

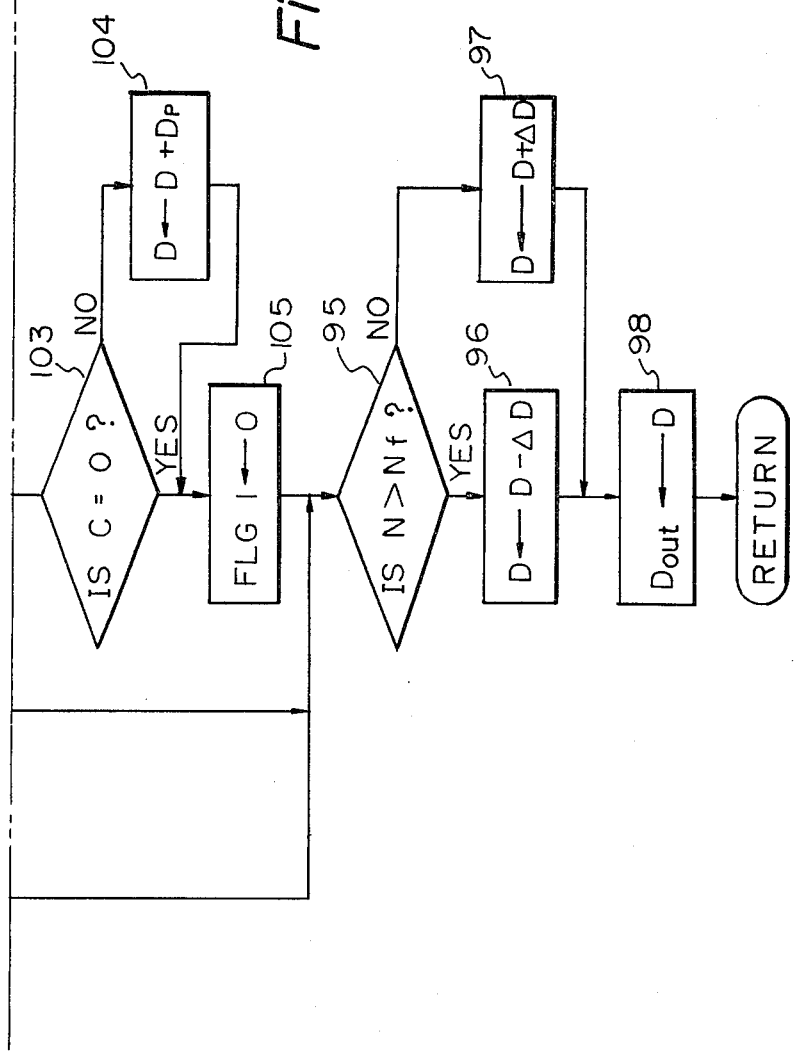

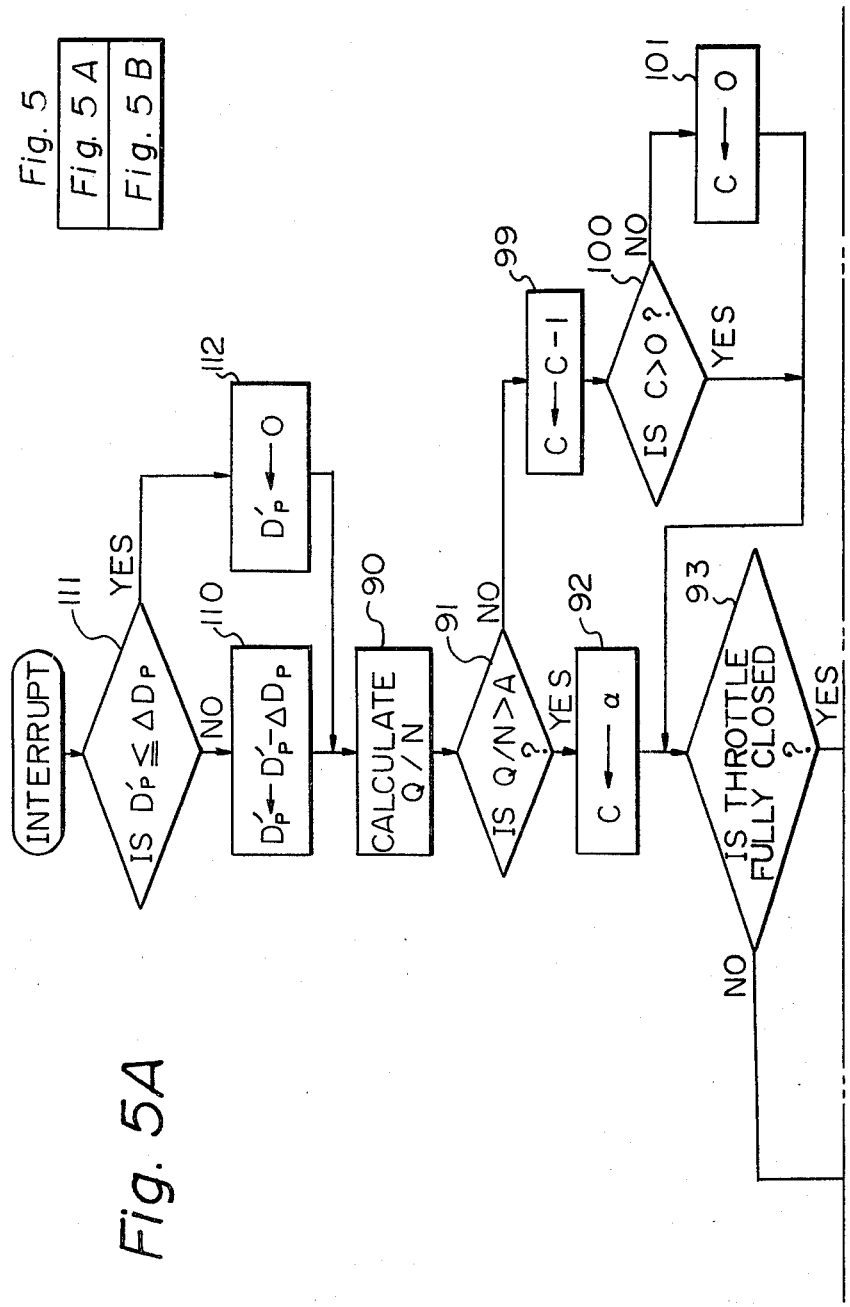

BYPASS AIR INTAKE CONTROL FOR AN INTERNAL COMBUSTION ENGINE

BACKGROUND OF THE INVENTION

The present invention relates to a method of controlling the flow rate of air intake of an internal combustion engine, and to apparatus for carrying out the method. The invention particularly relates to an air intake system and method for controlling a throttle valve at its fully closed position.

There is a known method of controlling the air intake of an internal combustion engine when a throttle valve in an intake passage is fully closed. According to this conventional method, the flow rate of intake air when the throttle valve is fully closed is controlled by adjusting the cross-sectional area of a bypass passage around part of a flow passage. The cross-sectional area is adjusted by means of a control valve in the air bypass passage which connects a first part of the intake passage at a location upstream of the throttle valve with a second part of the intake passage at a location downstream of the throttle valve. Such an air intake control method is usually employed for controlling the idling rotational speed of the engine. The idling rotational speed can be controlled if the control valve is adjusted to control the flow rate of the air that passes into the engine through the bypass passage so that the detected actual rotational speed of the engine becomes equal to the desired idling rotational speed.

Among the systems for controlling the flow rate of the intake air, some are equipped with a deceleration control function that causes the valve for controlling the cross-sectional area of the flow passage to increase its opening when the throttle valve is changed from an opened position to a closed position, in order to prevent the flow rate of the intake air from suddenly decreasing when the engine starts to decelerate. The purpose of the deceleration control function is to prevent the mixture gas from becoming too rich when the engine is decelerating and to maintain a suitable flow rate of the intake air to improve combustion and to prevent misfiring in order to restrain excessive emission of carbon monoxide and unburned hydrocarbons. In an engine without an air bypass passage, the deceleration control function is achieved by, for example, a throttle return check mechanism or dashpot which prevents the throttle valve from being quickly closed when the foot of the driver is separated from the accelerator pedal.

When the deceleration control function is added to a system for controlling the air intake according to the conventional art, a throttle closure switch detects whether the throttle valve is fully closed or not, and the control valve in the bypass intake passage is actuated toward the opening direction, depending solely upon the detected result from the throttle closure switch. When the throttle valve approaches the fully closed position, however, the throttle closure switch cannot clearly discriminate whether it is fully closed or not, and the throttle closure switch switches repeatedly between its turn-on and turn-off operations. Consequently, under light load conditions in which the throttle valve is close to the fully closed position, the control valve in the bypass intake passage undergoes the opening and closing operations. Therefore, the flow rate of the intake air undergoes variation, which makes it difficult to continue the operation in a stable manner under light load conditions.

SUMMARY OF THE INVENTION

It is an object of the present invention to provide a method of controlling the air intake of an internal combustion engine, which is capable of maintaining stable operation under a light load condition and is equipped with a deceleration control function.

According to the present invention that method of controlling the air intake comprises the steps of: generating a rotational speed signal which corresponds to the actual rotational speed of the engine; comparing the signal with a reference speed signal, which represents a desired idling rotational speed of the engine, to generate a control signal for adjusting the flow cross section of the air bypass passage; load discrimination signal that indicates whether or not the engine is under a heavy load condition or is in a transitional condition from the heavy load condition to a light load condition. The position of the throttle valve is also monitored to generate a throttle position signal to indicate whether or not the throttle valve is at the fully closed position. In response to the load discrimination signal and to the throttle position signal, the control output signal is increased by a predetermined value, the increase being executed only when the throttle valve changes from an open position to the fully closed position during the heavy load condition or the transitional condition. The cross section of the air bypass passage is adjusted in response to the control output signal to control the flow rate of air drawn through the air bypass passage so as to reduce the difference between the actual rotational speed signal and the reference rotational speed signal.

The above and other related objects and features of the present invention will be apparent from the description of the present invention set forth below, with reference to the accompanying drawings, as well as from the claims.

BRIEF DESCRIPTION OF THE DRAWINGS

FIGS. 2A and 2B are a block diagram illustrating a control circuit in the system of FIG. 1;

FIGS. 3A and 3B are a flow diagram illustrating one operation of the digital computer in the control circuit of FIG. 2;

FIGS. 5A and 5B are a flow diagram illustrating another operation of the digital computer in the control circuit of FIG. 2.

DETAILED DESCRIPTION OF THE PREFERRED EMBODIMENTS

Figure 1:
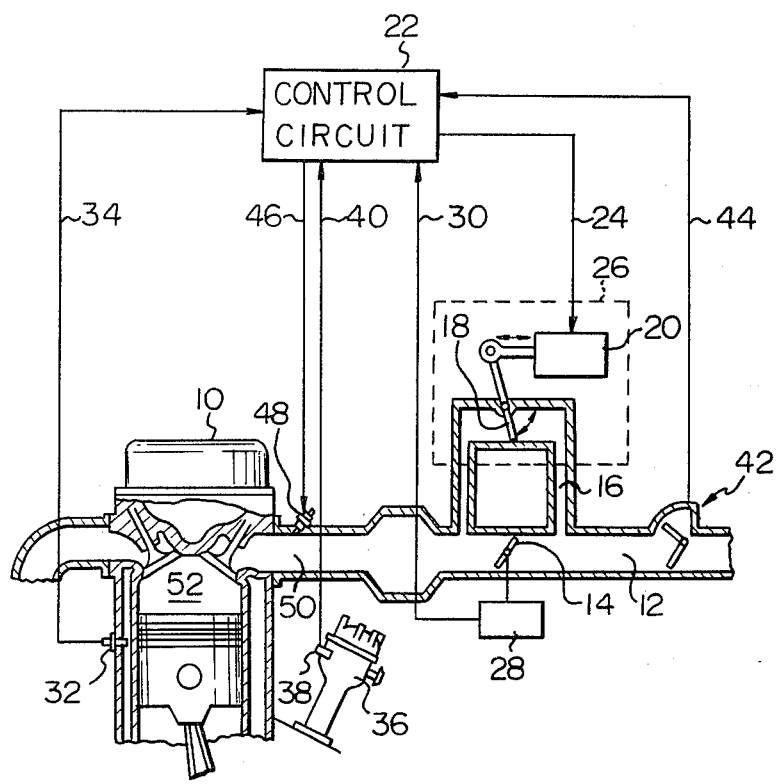
FIG. 1 is a schematic diagram illustrating a system in which the present invention is used.

FIG. 1 shows an example of an electronic fuel injection control system of an internal combustion engine, which, according to the present invention, includes an engine body 10 and an intake passage 12. A throttle valve 14 is disposed in the intake passage 12. A control valve 18 is provided for controlling the cross-sectional area of an air bypass passage 16. connected to the intake passage 12 at a first position upstream of the throttle valve 14 and at a second position downstream of the throttle valve 14 so as to bypass the throttle valve 14. An actuator 20 for actuating the control valve 18 is energized by a drive signal from a control circuit 22 via a line 24. In FIG. 1, a fundamental constitute of control mechanism 26, which the control valve 18 and the actuator 20 constitute the main components of a flow rate control mechanism 26. It should, however, be noted that any widely known flow rate control mechanism may be used if it is capable of controlling the cross-sectional area of the bypass passage in response to the applied electrical signals.

A throttle position switch at 28, for detecting whether the throttle valve 14 is fully closed, is attached to the rotary shaft of the throttle valve 14. The detection signal (throttle position signal) from the switch 28 is fed to the control circuit 22 via a line 30.

A coolant temperature sensor 32 for detecting the temperature of the coolant of the engine is installed in the cylinder block of the engine. The coolant temperature sensor 32 consists of a temperature sensitive resistance element, such as a thermistor. When a predetermined voltage is applied, a voltage signal produced across the temperature sensitive resistance element is fed to the control circuit 22 via a line 34.

A distributor 36 of the engine is provided with a crank angle sensor 38 which generates a crank angle signal each time the distributor shaft or the crank shaft rotates by a predetermined angle, and this signal is fed to the control circuit 22 via a line 40.

As is well known, in an electronic control fuel injection type internal combustion engine, the flow rate of the intake air is detected by an air flow sensor 42 in the intake passage 12, and the resulting signal is fed to the control circuit 22 via a line 44. The control circuit 22 calculates the amount of the fuel to be injected in response to the detected flow rate of the intake air and the rotational speed of the engine, and feeds an injection signal to the fuel injection valve 48 via a line 46. Therefore, the fuel of an amount corresponding to the amount of the intake air is supplied to a combustion chamber 52 from the injection valve 48 via an intake manifold 50. Thus, the rotational speed of the engine can be controlled by adjusting the amount of the intake air by means of the throttle valve 14 or the control valve 18.

Figure 2B:
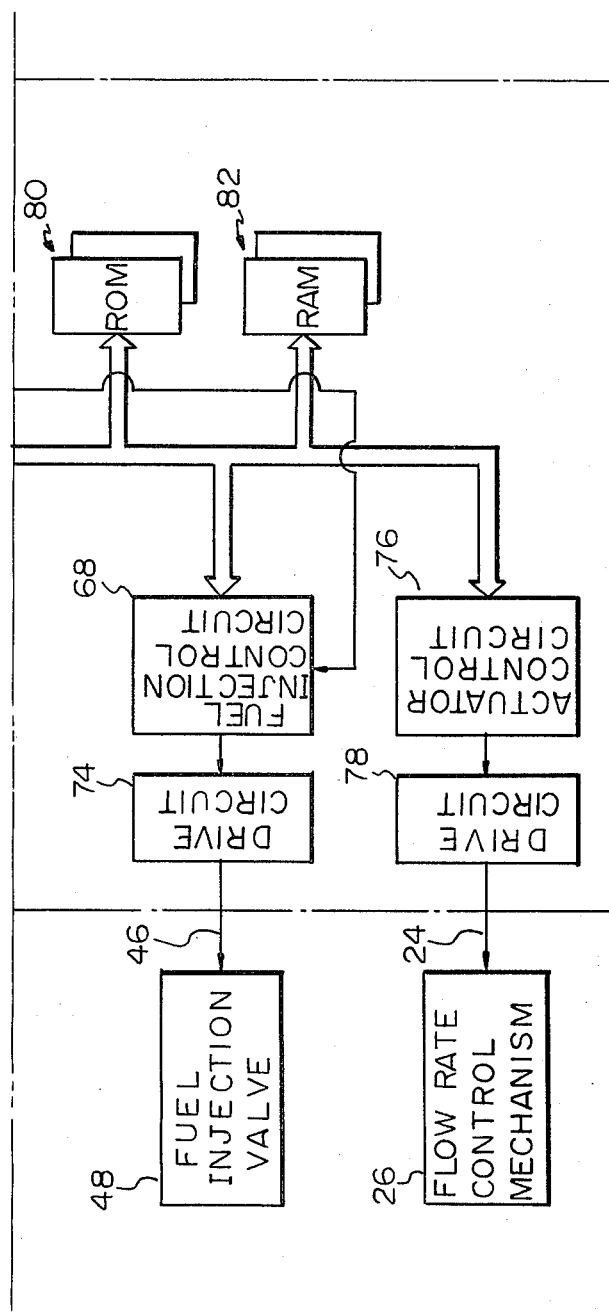

FIG. 2 is a block diagram of the control circuit 22 in FIG. 1. The control circuit 22 in this case uses a digital computer (microcomputer) of a stored program type and includes reference numeral 60 an analog-to-digital converter (A/D converter) 60 having an analog multiplexer function. The detection signals from the air flow sensor 42 and the coolant temperature sensor 32 are fed to the A/D converter 60 and are successively converted into binary number signals.

The crank angle signal from the crank angle sensor 38, i.e., a pulse produced at every 30° increment of crank rotation, is fed to a speed signal forming circuit 62 via the line 40. The speed signal forming circuit 62 consists of a gate which is alternately opened and closed by the above-mentioned pulse produced at every crank angle of 30°, and a binary counter which counts the number of clock pulses that pass through the gate from a clock generator circuit 64 during each open interval of the gate. The speed signal is in the form of a binary number that corresponds to the actual rotational speed of the engine.

The detection signal from the throttle position switch 28 is fed to a latch circuit 66 where the content of the detection signal is temporarily stored.

A fuel injection control circuit 68 for producing an injection signal having a duration equal to an injection period of the fuel injection valve 48 includes, for example, an output register and a presettable down counter. A binary signal which corresponds to the injection period of the fuel injection valve 48 is applied from a central processing unit (CPU) 70 to the above-mentioned output register via a bus 72, and is loaded onto the down counter at a predetermined timing. The down counter performs the counting down operation with respect to the loaded content in response to the clock pulses from the clock generator circuit 64 to form the injection signal, which is converted by a drive circuit 74 into the drive current sent to the fuel injection valve 48. An actuator control circuit 76 consists of an output register, which receives a control output signal in the form of a binary number from the CPU 70 via the bus 72, and a D/A converter for generating an analog voltage that corresponds to the control output signal. The analog signal from the actuator control circuit 76 is amplified by a drive circuit 78 and fed to the actuator 20 of the flow rate control mechanism 26.

The aforementioned A/D converter 60, the speed signal forming circuit 62, the latch circuit 66, the fuel injection control circuit 68 and the actuator control circuit 76 are connected, via the bus 72, to the CPU 70, the read-only memory (ROM) 80, the random access memory (RAM) 82 and the clock generator circuit 64, all of which constitute the digital computer. Although not shown, the digital computer is equipped, as is standard, with an input/output control circuit, a memory control circuit, and the like. In the ROM 80 have been stored: an interrupt processing program for controlling the flow rate of the intake air that will be mentioned later, a program for calculating a fuel injection period in a manner well known in the art but not described in this specification, a program for processing the main routine, a program for controlling the operation of the engine, and a variety of data that are required for executing the operation.

The operation of the digital computer will be explained in conjunction with the flow diagram of FIG. 3.

In the main processing routine, the CPU 70 introduces new data which represents the actual rotational speed N of the engine from the speed signal forming circuit 62, and stores the data in a predetermined region in the RAM 82. Further, each time an A/D conversion interrupt processing routine, which is executed at a predetermined time interval or at a predetermined crank angle interval, is performed, the CPU 70 introduces new data which represents the flow rate Q of the intake air and/or new data which represents the coolant temperature, and stores them in predetermined regions in the RAM 82.

As an interrupt request signal is fed from the clock generator circuit 64 via the line 84 at every predetermined period of time, for example, at every period of 50 msec., the CPU 70 executes the program for controlling the flow rate of the intake air, shown in FIG. 3. First, at a point 90, the CPU 70 extracts from the RAM 82, the data related to the flow rate of the air and the rotational speed N, and calculates the value Q/N. The calculated value Q/N corresponds to the load condition on the engine, and is compared at a point 91 with a selected value A to determine whether the load condition on the engine is greater than the selected value or not. If Q/N is greater than A, which occurs when the engine is under the condition of a heavy load, the program proceeds to a point 92 where a variable value C for measuring the time is set equal to an initial value $\alpha$. The program then proceeds to a point 93.

At the point 93, the CPU 70 examines the detection signal obtained from the throttle position switch 28 and stored in the latch circuit 66 and determines whether the throttle valve 14 is at a fully closed position or not. When the engine is under the condition of heavy load, the throttle valve 14 is usually open, and therefore, the CPU 70 proceeds to the next point 94 to set a flag FLG 1, that will be mentioned later, to "1". The program then proceeds to a point 95.

Points 95 through 98 perform ordinary processings to control the idling rotational speed. First, at the point 95, the CPU 70 determines whether the actual rotational speed N of the engine is greater than a desired rotational speed $N_f$. The desired rotational speed $N_f$ will be determined depending, for example, upon the water temperature of the engine. When $N > N_f$, the program proceeds to the point 96 where a control value D is reduced by a predetermined value $\Delta D$. When $N \leq N_f$, the program proceeds to a point 97 where the control value D is increased by the predetermined value $\Delta D$. The program then proceeds to a point 98 where the calculated control value is supplied as a control output signal $D_{out}$ to the actuator control circuit 76.

As mentioned previously, the actuator control circuit 76 converts the digital control output signal $D_{out}$ to an analog voltage and applies the analog voltage signal to the actuator 20 of the flow control mechanism 26 via the drive circuit 78. Therefore, the actuator 20 controls the opening degree of the control valve 18 in an analog manner responsive to the voltage signals. As a result, air is permitted to enter into combustion chamber 52 via the bypass passage 16 at a flow rate corresponding to the value of the control output signal $D_{out}$. The idling speed is controlled by feedback to approach the desired value, since the processings in the points 95 through 98 are repeatly executed at the occurrence of each interrupt request signal from the clock circuit 64. P If it is determined at the point 91 that $Q/N \leq A$, i.e., if it is determined that the load condition on the engine is lighter than the predetermined value A, the program proceeds to a point 99 where the variable value C is reduced by one. At a point 100, the CPU 70 then tests to determine whether the variable value C is greater than zero or not. Only when the answer is "No" is variable value C set equal to zero at a point 101. The program then proceeds to the point 93. If the answer to the test at point 100 is "Yes", indicating that the variable value C is greater than zero, the program proceeds directly to the point 93. The above-mentioned points 99 through 101 work to check as to whether a predetermined time t has passed or not after the load condition on the engine has been decreased so that it is smaller than the predetermined value A; in other words, after the load condition changes from a heavy load to a light load. The variable value C will be zero when the predetermined time t has passed, and will not be zero when the predetermined time t has not passed. The predetermined time t will be one second if an interrupt period in the processing operation is set to 50 msec and the initial value $\alpha$ of the variable value C in the point 92 is set to twenty. When it is determined by the test at point 93 that the throttle valve 14 is in the fully closed position, the program proceeds to the point 102 where the CPU 70 tests to determine whether the flag FLG 1 is "1" or not. The flag FLG 1 works to that processings of the points 103 through 105 are executed only when the program has reached the point 102 for the first time after the throttle valve 14 has been fully closed. Furthermore the flag FLG 1 works so that processings of the points 103 through 105 are not executed unless the processing FLG 1 is set equal to "1" at the point 94 after the throttle valve 14 is opened. In the initial operation cycle of this interrupt routine, in which the throttle valve 14 is fully closed and FLG 1 is "0", the CPU 70 proceeds to the point 103 to determine whether the variable value C is zero or not. If the load of the engine is ligher than the predetermined value A, but the time t has not yet lapsed, the variable value C is not zero as mentioned above. Therefore, the program proceeds from the point 103 to the point 104 where the control value D is increased by a predetermined value $D_p$. The program then proceeds to the point 105. When C=0, i.e., when the time t has lapsed with $Q/N \leq A$, the program proceeds to the point 105 without passing through the point 104. At the point 105, flag FLG 1 is reset to "0". The program then proceeds to the above-mentioned point 95.

Figure 4:
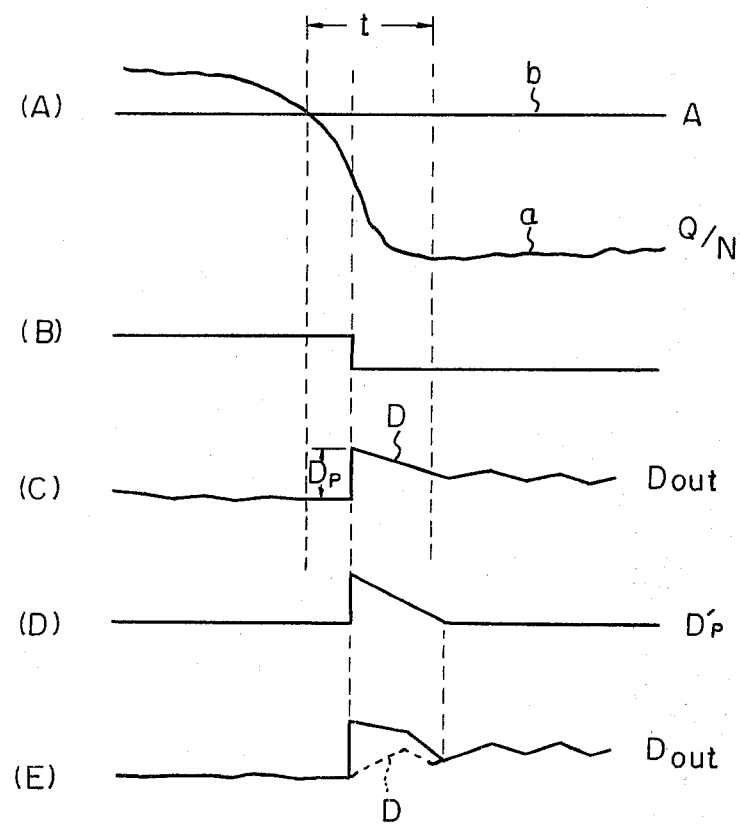
FIG. 4 contains five wave forms (A), (B), (C), (D) and (E) for illustrating the operations and effects of the control circuit of FIG. 2.

FIG. 4 illustrates the operation of the above-mentioned processings routine, in which the value a of the graph 4(A) represents the load condition Q/N of the engine, the valve b denotes a predetermined value that corresponds to the value A used at the point 91 in the flow diagram of FIG. 3, the graph 4(B) shows a throttle position signal which indicates whether the throttle valve 14 is fully closed or not, and the graph 4(C) shows the control output signal $D_{out}$ which is equivalent to the opening degree of the control valve 18. That is, the opening degree of the control valve 18 is additionally increased by an amount which corresponds to the predetermined value $D_P$ only when the throttle valve 14 is fully closed (which occurs at the time of the sudden transition in graph 4(B)) within the time t after the load a of the engine is decreased to be smaller than the predetermined value b. Therefore, the opening degree of the control valve 18 is not increased at the instant the load a becomes smaller than the predetermined value b or when the throttle valve is fully closed after the time t has elasped since the load a became smaller than the predetermined value b. That is, the opening degree of the control valve 18 is not increased when the engine is running under light load conditions. Consequently, a light load operation of the engine is stably maintained. When the throttle valve is fully closed (when decelerated) while the engine is running under a heavy-load condition, the deceleration control is carried out as well as it is done by the conventional technique.

Figure 5B:
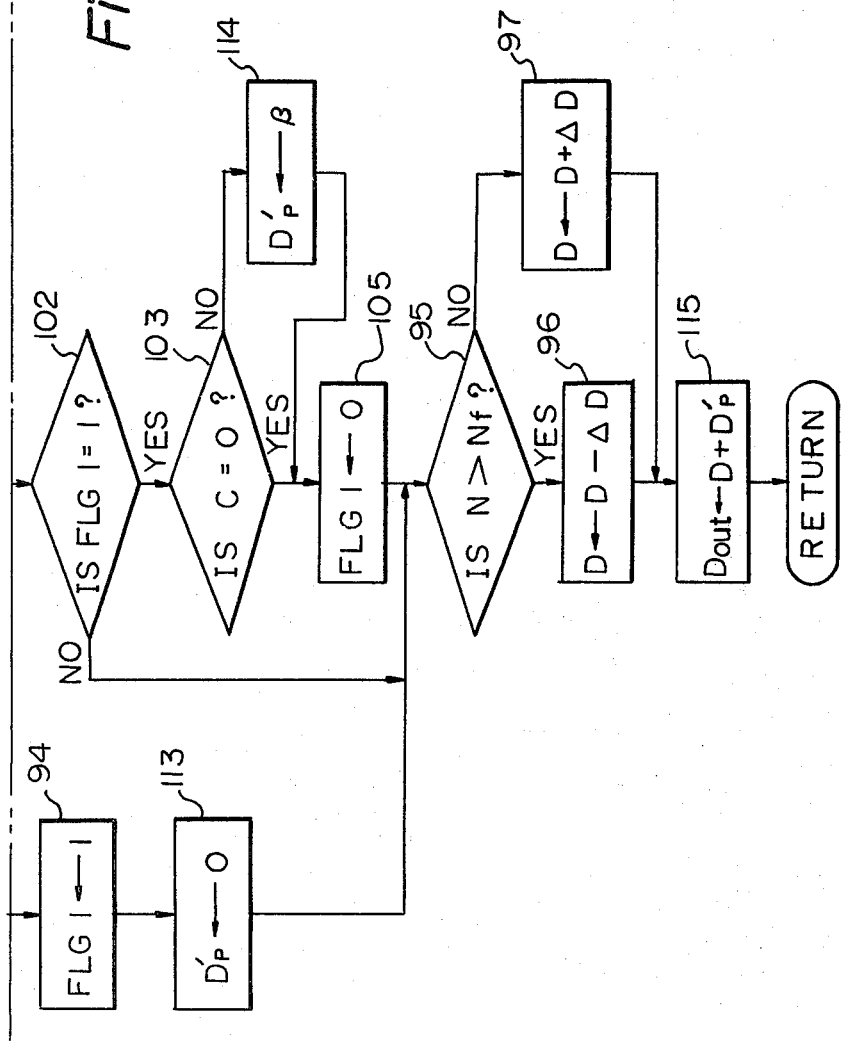

FIG. 5 is a flow diagram of another operation processing routine for controlling the flow rate of the intake air according to the present invention. According to the processing routine of FIG. 3, the value $D_P$, by which the opening degree of the control valve will be additionally increased, is added to the control value D at the point 104. However, in the processing routine of FIG. 5, a value $D_{P}'$, which corresponds to the above-mentioned value $D_P$, is calculated separately from the control value D, and the control value D and the value $D_{P}'$ by which the value D will be additionally increased are added together at a point 115 whereby a final control output signal $D_{out}$ is obtained. The value $D_{P}'$ is not constant but is equal to an initial value B immediately after the throttle valve 14 is fully closed, and gradually decreases with the lapse of time. If the throttle valve 14 remains open, the processing $D_{P}'$ is set equal to zero. The operations of other processings are quite the same as those of the processing routine of FIG. 3. At a point 110 of the program of FIG. 5, the CPU 70 executes the processing to decrease the value $D_P'$, by $\Delta D_P$ each time, and at points 111 and 112, the CPU 70 executes the processing such that the value $D_P'$ will not become smaller than zero. A point 113 sets the value $D_P'$ to "0" when the throttle valve is opened. The program will pass through a point 114 only when the load of the engine is decreased so that it becomes lighter than the predetermined value A and, further the throttle valve is fully closed before the predetermined time t is lapsed. In the point 114, the value $D_P'$ is set equal to the initial value $\beta$ which is nearly equal to the value $D_P$ in the processing routine of FIG. 3.

The graphs 4(D) and 4(E) of FIG. 4 illustrate the operations of the processing routine of FIG. 5, in which the graph 4(D) shows the value $D_P'$ by which the control value D will be additionally increased, and the graph 4(E) shows the control value D as a broken line, and the control ouput signal $D_{out}$, which is the sum of the control value D and the value $D_P'$.

The effects obtained by the processing routine of FIG. 5 are substantially the same as the effects by the processing routine of FIG. 3.

To find the load conditions of the engine according to the above-mentioned embodiments, the relation Q/N is calculated from the rotational speed N and the flow rate of the intake air Q. However, the load conditions can also be found by detecting the intake manifold pressure of the engine. Even when the load conditions of the engine are found in this way, the present invention can be put into practice in the same manner as the above-mentioned embodiments.

According to the method of the present invention as illustrated in detail in the foregoing, the cross-sectional area of the air bypass passage is additionally increased by a predetermined value only when the throttle valve changes from an open position to the fully closed position while the engine is under heavy load conditions or is in a transitional condition from the heavy load condition to a light load condition. Therefore, the deceleration control function is exhibited only when the engine under the heavy load conditions is decelerated. Moreover, it is possible to prevent the running condition from becoming unstable, which condition is caused by the turn-on or turn-off operation of the throttle position sensor when the engine runs under light load conditions. In effect, it is allowed to maintain the operation of the engine stably under light load conditions.

As many widely different embodiments of the present invention may be constructed without departing from the spirit and scope of the present invention, it should be understood that the present invention is not limited to the specific embodiments described in this specification, except as defined in the appended claims.

I claim:

1. A method of controlling the air intake of an internal combustion engine having an intake passage, a throttle valve disposed in said intake passage, and an air bypass passage communicating a location in the intake passage upstream of the throttle valve with a location in the intake passage downstream of the throttle valve, the method including generating a rotational speed signal corresponding to the actual rotating speed of the engine, generating a reference speed signal corresponding to a desired idling speed, comparing the rotational speed signal with the reference speed signal, generating a control output signal corresponding to a difference between the rotational speed signal and the reference speed signal, and adjusting the cross-sectional flow area of the bypass passage in response to the control output signal, wherein the improvement comprises:
   monitoring the engine load by
      generating an air intake signal representing the actual flow rate of air drawn into the engine,
      generating a load condition signal in response to the air intake signal and the rotational speed signal,
      comparing said generated load condition signal with a predetermined reference load signal, and
      generating a first signal when the load condition signal is greater than the predetermined reference load signal and a second signal when the load condition signal is less than the predetermined reference load signal;
   generating a load discrimination signal whenever the first signal changes to the second signal, indicating that the engine is in transition from a heavy load condition to a light load condition;
   generating a throttle position signal when the throttle valve changes from an open condition to the fully closed condition; and
   incrementing said control output signal by a predetermined value in response to the simultaneous occurrence of said load discrimination signal and said throttle position signal so as to increase the cross-sectional flow area of the bypass passage during engine deceleration from a heavy load condition.

2. The method of claim 1, further comprising maintaining said load discrimination signal for a predetermined time period after the engine load changes from a heavy load condition to a light load condition.

3. The method of claim 1, wherein the step of generating said load condition signal comprises generating a signal corresponding to the ratio of the air intake signal and the rotational speed signal.

4. The method of claim 1, further comprising gradually reducing to zero the incremental value added to the control output signal at said incrementing step.

5. Apparatus for controlling auxiliary air delivered to an internal combustion engine having a main intake passage, a main throttle valve disposed in the intake passage, a bypass passage communicating a first part of the main intake passage upstream of the main throttle valve to a second part of the main intake passage downstream of the main throttle valve, a control valve disposed in the bypass passage, means for generating a signal representing the air flow rate Q into the engine, means for generating a signal N representing the rotational speed of the engine, means for generating a reference speed signal Nf representing a desired idling speed, means for generating a control signal corresponding to the difference between N and Nf, and means for actuating the control valve in response to the control signal so as to reduce the difference between N and Nf, wherein the improvement comprises:
   means responsive to the air flow rate signal Q and the rotational speed signal N for generating a load condition signal representing the ratio Q/N;
   means for generating a reference load signal corresponding to a transition level between a light engine load and a heavy engine load;
   means responsive to the load condition signal and the reference load signal for generating a load discrimination signal whenever the value of the load condition signal is greater than the value of the reference load signal and for a predetermined time period after the engine load decreases from above to below the value of the reference load signal;

means for generating a throttle position signal when the main throttle valve changes from open to fully closed;

means connected to the control signal generating means for incrementing the control signal by a predetermined amount in response to the simultaneous occurrence of the load discrimination signal and the throttle position signal.

6. The apparatus of claim 5, further comprising means for gradually reducing to zero the incremental value added to the control output signal upon the simultaneous occurrence of the load discrimination signal and the throttle position signal.

* * * * *